United States Patent [19]

Taguchi et al.

[11] Patent Number: 4,478,433
[45] Date of Patent: Oct. 23, 1984

[54] SAFETY SEATBELT RETRACTOR

[75] Inventors: Masahiro Taguchi, Okazaki; Satosi Kuwakado, Aichi; Noboru Tsuge, Kariya, all of Japan

[73] Assignee: Nippon Soken, Inc., Nishio, Japan

[21] Appl. No.: 427,819

[22] Filed: Sep. 29, 1982

[30] Foreign Application Priority Data

Nov. 4, 1981 [JP] Japan ................................ 56-176624
Dec. 11, 1981 [JP] Japan ................................ 56-200677

[51] Int. Cl.³ ............................................. B60R 21/10
[52] U.S. Cl. ................................... 280/807; 180/268
[58] Field of Search ................. 280/801, 807; 180/268

[56] References Cited

U.S. PATENT DOCUMENTS

| | | | |
|---|---|---|---|
| 3,838,746 | 10/1974 | Andres | 180/268 |
| 4,103,754 | 8/1978 | Ashworth et al. | 180/268 |
| 4,198,011 | 4/1980 | Kamijo et al. | 280/807 |
| 4,261,530 | 4/1981 | Asai et al. | 180/268 |
| 4,261,531 | 4/1981 | Naitoh | 280/807 |
| 4,342,435 | 8/1982 | Yanagihara | 280/807 |

FOREIGN PATENT DOCUMENTS

1047016 1/1979 Canada ................................ 280/807
2246296 3/1974 Fed. Rep. of Germany ...... 180/268

Primary Examiner—John A. Pekar
Assistant Examiner—Kenneth R. Rice
Attorney, Agent, or Firm—Cushman, Darby & Cushman

[57] ABSTRACT

A safety seatbelt retractor for use in a vehicle including a frame adapted to be fixed to the vehicle and a winding shaft rotatably mounted on the frame. The seatbelt is normally wound around the winding shaft. The winding shaft has associated therewith a spring member. When the seatbelt is unwound out of the winding shaft, the spring member applies no or weak biasing force to the winding shaft in such direction as to cause the seatbelt to be wound therearound. During the normal fastening of the seatbelt on a passenger taking his seat of the vehicle, the spring member continuously applies a weak biasing force to the winding shaft in the direction mentioned above. The winding shaft has also associated therewith a drive unit which, when operated, drives the winding shaft to rotate the same so as to cause the seatbelt to be wound around the winding shaft. The drive unit is operated when the seatbelt is unfastened or the passenger gets off the vehicle with the seatbelt unwound out of the winding shaft.

23 Claims, 8 Drawing Figures

SAFETY SEATBELT RETRACTOR

BACKGROUND OF THE INVENTION

Field of the Invention

The present invention relates to a retractor for a safety seatbelt to be fastened on a passenger, for use in a vehicle having at least one seat for the passenger.

Description of the Invention

The prior art seatbelt retractor of the kind referred to above comprises a frame adapted to be fixed to a vehicle body of the vehicle and a winding shaft rotatably mounted on the frame. The winding shaft has associated therewith a spirally wound spring having a considerably high spring constant. The spring has one end thereof fixedly connected to the winding shaft and the other end fixed relative to the frame for continuously applying a considerable biasing force to the winding shaft in such direction as to cause the seatbelt to be wound around the winding shaft. Upon the fastening of the seatbelt, the passenger taking his seat unwinds the seatbelt out of the winding shaft against the biasing force of the spring and locks a buckle connected to the seatbelt. The slack of the seatbelt, if any, is removed by the rewinding of the seatbelt around the winding shaft under the biasing force of the spring so that the seatbelt is snugly fastened on the passenger. When the seatbelt is unfastened and the buckle is unlocked, the seatbelt is automatically wound around the winding shaft under the strong biasing force of the spring.

Because of such arrangement of the prior art seatbelt retractor, the retractor is disadvantageous in that as the seatbelt is unwound out of the winding shaft to fasten the seatbelt, the force required to unwind the seatbelt out of the winding shaft is gradually increased, i.e., a considerable unwinding force is required for the passenger to unwind the seatbelt to fasten the same. This often causes the passenger to think it is trouble to perform the fastening operation of the seatbelt, and causes the passenger to dislike or hate the fastening operation of the seatbelt. In addition, the prior art retractor has the disadvantage that because the seatbelt is subjected to a considerable high tension force due to the great biasing force of the spring and is strongly urged against the passenger during the normal fastening of the seatbelt, the passenger is subjected to a strong sense of oppression and a strong feeling of discomfort from the fastened seatbelt.

SUMMARY OF THE INVENTION

An object of the present invention is to provide a safety seatbelt retractor for use in vehicles which can eliminate or minimize the above discussed disadvantages.

According to the present invention, there is provided a retractor for a safety seatbelt to be fastened on a passenger, for use in a vehicle having at least one seat for the passenger, the retractor comprising: a frame adapted to be fixed to the vehicle; a winding shaft rotatably mounted on the frame, the seatbelt being normally wound around the winding shaft; any one of first and second spring means each having a relatively low spring constant, the first spring means continuously applying a weak biasing force to the winding shaft in such direction as to cause the seatbelt to be wound therearound, the second spring means applying no biasing force to the seatbelt during the unwinding of the seatbelt out of the winding shaft in order for the passenger to fasten the seatbelt, but applying a weak biasing force to the winding shaft in such direction as to cause the seatbelt to be wound therearound after the snug fastening of the seatbelt on the passenger; drive means drivingly connected to the winding shaft, the drive means, when operated, driving the winding shaft to rotate the same so as to cause the seatbelt to be forcedly wound around the winding shaft; and control means operative in response to one of two conditions, one being such that the seatbelt is unwound out of the winding shaft and the passenger gets off the vehicle, and the other condition being such that the seatbelt is unwound out of the winding shaft and the seatbelt is unfastened, for controlling the drive means so as to cause the same to be operated.

DETAILED DESCRIPTION OF THE PREFERRED EMBODIMENTS

Figure 1:
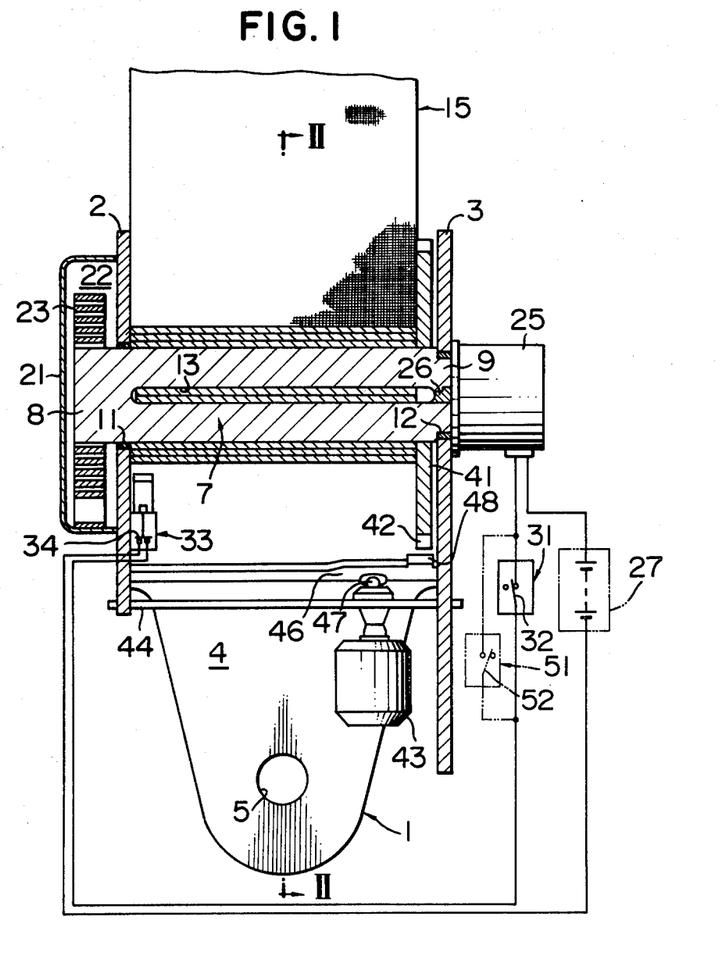
FIG. 1 is a cross-sectional view showing a safety seatbelt retractor in accordance with a first embodiment of the present invention, and taken along the line I—I of FIG. 2.
Figure 2:
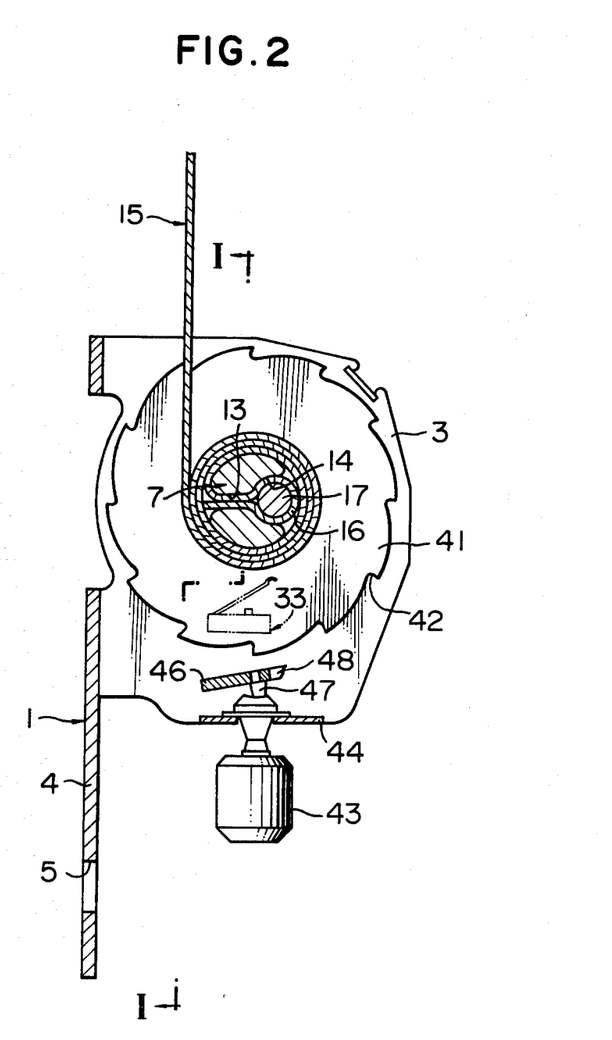
FIG. 2 is a cross-sectional view taken along the line II—II of FIG. 1.

Referring to FIGS. 1 and 2, there is illustrated a safety seatbelt retractor for use in a vehicle, in accordance with the first embodiment of the present invention. The retractor comprises a frame 1 which includes a pair of parallel side walls 2 and 3 and a rear wall 4 extending therebetween. The rear wall 4 has therethrough a hole 5 which is adapted to receive therein fastening means (not shown) such as bolt to fixedly mount the retractor to a vehicle body (not shown).

A winding shaft 7 has axial opposite end portions 8 and 9 thereof fitted in aligned holes in the side walls 2 and 3 through bearing bushes 11 and 12 made of fluorine-contained polymers or the like, respectively, so that the winding shaft 7 is rotatably mounted on the frame 1. The winding shaft 7 has formed therethrough a longitudinal slot 13 and a longitudinal recess 14 communicating therewith. A seatbelt 15 for a passenger has one end thereof seamed to form a loop 16 into which a bar 17 is inserted. The loop 16 having inserted thereinto the bar 17 is received in the recess 14 in the winding shaft 7, and the seamed portion of the seatbelt 15 is located in the slot 13. The other end of the seatbelt has attached thereto an anchor or buckle (not shown), and the seatbelt is normally wound around the winding shaft 7.

A cup-shaped member 21 is rigidly mounted on and cooperates with the side wall 2 of the frame 1 to define a chamber 22 for receiving therein the end portion 8 of the winding shaft 7. A spirally wound and preloaded spring 23 having a relatively low spring constant is disposed within the chamber 22 and has one end secured to the winding shaft 7 and the other end secured to the inner surface of the cup-shaped member 21 for continuously applying a low or weak biasing force to the shaft 7 in such direction as to cause the seatbelt 15 to be wound therearound.

An electric motor 25 is mounted on the side wall 3 of the frame 1 and has an output shaft 26 received in an axial bore in the winding shaft 7 so that the output shaft 26 is drivingly connected to the winding shaft 7 to rotate the same in such direction as to cause the seatbelt 15 to be wound around the winding shaft 7 when the motor 25 is energized. An electric power source 27 comprising a battery is connected to the motor 25. A seat sensor 31 is mounted on each of seats of the vehicle for sensing whether the passenger takes his seat to generate an OFF-signal when the passenger takes his seat and an ON-signal when the passenger leaves his seat to get off the vehicle. The seat sensor 31 comprises a normally closed switch 32 connected in series to the motor 25 and the power source 27 with the switch 32 illustrated as being opened in FIG. 1. A belt-diameter sensor 33 is mounted on the inner surface of the side wall 2 of the frame 1 opposite to the cup-shaped member 21 for sensing the diameter of the seatbelt 15 wound around the winding shaft 7 to generate an ON-signal when the diameter of the seatbelt 15 wound around the shaft 7 is at most equal to a predetermined diameter and an OFF-signal when the diameter of the seatbelt wound around the shaft 7 is above the predetermined diameter. The belt-diameter sensor 33 comprises a normally open switch 34 which is connected in series to the switch 32 of the seat sensor 31 and is closed when the diameter of the seatbelt 15 wound around the winding shaft 7 reaches the predetermined diameter. The belt-diameter sensor 33 does not in fact appear in FIG. 2, but is shown by the phantom line for clarification. The sensors 31 and 33 constitute a control unit for controlling the operation or energization and deenergization of the motor 25.

A disc-like toothed member 41 is fixedly mounted on the winding shaft 7 for rotation therewith. The toothed member 41 is formed on its outer peripheral surface with unidirectional teeth 42. A pendulum 43 is pivotably supported by a bracket plate 44 extending between and secured to the side walls 2 and 3 of the frame 1, and is pivotable or swingable in response to a change in acceleration and deceleration of the vehicle. A pawl member 46 extends between and is pivotably supported by the side walls 2 and 3 and has a projection 47 downwardly projecting from the lower surface of the pawl member 46 and engaging with the top of the pendulum 43. A tooth 48 is formed on the pawl member 46. The pawl member is swingable in response to the swinging movement of the pendulum 43 between a normal position shown in FIGS. 1 and 2 where the tooth 48 is disengaged from one of the teeth 42 on the toothed member 41 and a position (not shown) where the tooth 48 engages with one of the teeth 42 to lock the toothed member 41 against rotation relative to the frame 1 when the pendulum is tilted or swung in response to a predetermined deceleration of the vehicle, for example, upon the collision thereof.

The operation of the retractor illustrated in FIGS. 1 and 2 will be described with reference to the below table I which indicates the relation between the actions taken by the passenger and the operation of the control unit.

TABLE I

| action of passenger | whether passenger takes his seat | seat sensor signal | whether diameter of seatbelt around winding shaft is at most equal to predetermined diameter | belt-diameter sensor signal | signal to motor |
|---|---|---|---|---|---|
| prior to getting on vehicle | NO | ON | NO | OFF | OFF |
| upon getting on vehicle | NO | ON | NO | OFF | OFF |
| upon taking his seat | YES | OFF | NO | OFF | OFF |
| during unwinding of seatbelt out of winding shaft | YES | OFF | NO / YES | OFF / ON | OFF |
| during fastening of seatbelt | YES | OFF | YES | ON | OFF |
| upon unfastening of seatbelt | YES | OFF | YES | ON | OFF |
| upon getting off vehicle | NO | ON | YES | ON | ON |

It will be clearly seen in the table I that the motor 25 is energized in response to such a condition only that the switch 32 of the seat sensor 31 is closed and the switch 34 of the belt-diameter sensor 33 is closed. In other words, the motor 25 is energized only when the passenger leaves his seat and the diameter of the seatbelt wound around the winding shaft 7 is equal to or below a predetermined diameter. The energization of the motor 25 causes the winding shaft 7 to be rotated so that the seatbelt 15 is forcedly wound around the winding shaft 7. The table I also clearly indicates that conditions other than the condition mentioned above deenergize the motor 25 so as not to cause the winding shaft 7 to be forcedly rotated to perform the winding operation. When the seatbelt 15 is unwound out of the winding shaft 7, the motor 25 is deenergized and the output shaft 26 of the motor 25 directly connected to the winding shaft 7 is free to turn. Thus, when the seatbelt 15 is unwound out of the shaft 7 in order for the passenger to fasten the seatbelt, the tension force applied to the seatbelt is the weak biasing force only of the spirally wound spring 23 having a low spring constant. This enables the seatbelt 15 to be easily unwound out of the winding shaft 7 and also enables the buckle attached to the seatbelt to be easily locked.

Figure 3:
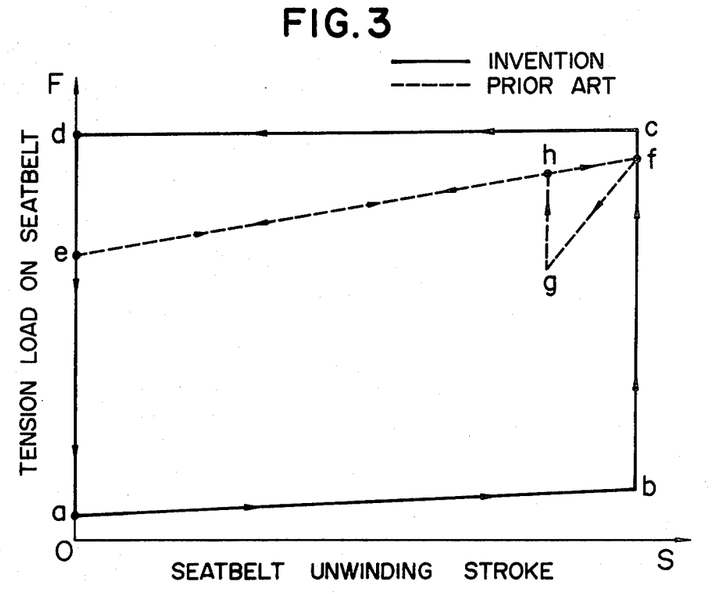
FIG. 3 is a graph showing characteristics of the retractor shown in FIGS. 1 and 2, and also showing characteristics of the previously described prior art retractor.

The characteristics of the tension load acting on the seatbelt 15 during fastening and unfastening thereof will be described with reference to FIG. 3 which illustrates how the tension load applied to the seatbelt 15 varies as the seatbelt is unwound out of the winding shaft 7 and is wound therearound. The solid line in FIG. 3 indicates the characteristics of the retractor according to the first embodiment of the present invention. As the seatbelt 15 is unwound out of the winding shaft 7 against the weak biasing force of the preloaded spring 23 in order for the passenger to fasten the seatbelt, the tension load applied to the seatbelt varies from a to b. Accordingly, during the fastening of the seatbelt 15 on the passenger, the weak tension load at the level b is constantly applied to the seatbelt. When the seatbelt 15 is unfastened and the passenger leaves his seat to cause the motor 25 to be energized so as to forcedly rotate the winding shaft 7, the tension load applied to the seatbelt varies from b to c, and from c to d. Thus, the seatbelt 15 is wound around the winding shaft 7 under the strong winding force from the motor 25. When the diameter of the seatbelt 15 wound around the winding shaft 7 reaches the predetermined diameter, the motor 25 is deenergized and the tension load on the seatbelt varies from d to a. The broken line in FIG. 3 indicates the characteristics of the prior art retractor described previously. In the prior art retractor, as the seatbelt is unwound out of the winding shaft in order for the passenger to fasten the seatbelt, the tension load applied to the seatbelt varies from e to f. At the point f, the buckle connected to the seatbelt is locked. The slack of the seatbelt is removed under the considerable high biasing force of the preloaded spring and the seatbelt is fastened on the passenger, during which the tension load on the seatbelt varies from f to g. When the buckle is unlocked and the seatbelt is unfastened, the tension load on the seatbelt varies from g to h, and from h to e.

As described above, in the retractor in accordance with the first embodiment of the present invention, the force required to unwind the seatbelt 15 in order for the passenger to fasten the seatbelt is extremely low as compared with the force required in the prior art retractor. In addition, in the illustrated retractor of the present invention, the force required to unwind the seatbelt is not so much increased as the seatbelt is unwound out of the winding shaft 7, and a substantially constant and low tension load is applied to the seatbelt during the normal fastening of the seatbelt on the passenger. Thus, the passenger is subjected to substantially no or only a little, if any, sense of oppression during the normal fastening of the seatbelt 15. Accordingly, the passenger can easily unwind the seatbelt out of the winding shaft 7 with little effort for the purpose of fastening of the seatbelt on him, and the passenger can continue to fasten the seatbelt in more comfortable manner. Furthermore, since the tension load or winding force applied to the seatbelt due to the motor 25 upon the winding of the seatbelt around the winding shaft 7 can be increased as compared with the winding force applied to the seatbelt due to the biasing force of the spirally wound spring in the prior art retractor, it is ensured that the seatbelt is wound around the winding shaft 7.

Upon the predetermined deceleration of the vehicle, for example, upon the collision thereof, the pendulum 43 is swung to cause the tooth 48 to engage with one of the teeth 42 of the toothed member 41, thereby to lock the winding shaft 7 against the rotation relative to the frame 1 to prevent the seatbelt 15 from being unwound out of the winding shaft, so that the passenger is restrained by the seatbelt and is safely protected from shocks.

As illustrated in FIG. 1, the seat sensor may be replaced with a door sensor 51 indicated by the phantom line. The door sensor 51 is mounted on each of the doors of the vehicle and sense whether the associated door is opened or closed to generate an ON-signal when the door is opened in order for the passenger to get off the vehicle and an OFF-signal when the door is closed. The door sensor 51 comprises a normally open switch 52 which is closed when the door is opened in order for the passenger to get off the vehicle. The below table II indicates the relation between the actions taken by the passenger and the operation of the control unit which comprises the sensors 33 and 51.

TABLE II

| action of passenger | whether vehicle door is closed | door sensor signal | whether diameter of seatbelt around winding shaft is at most equal to predetermined diameter | belt-diameter sensor signal | signal to motor |
| --- | --- | --- | --- | --- | --- |
| prior to getting on vehicle | YES | OFF | NO | OFF | OFF |
| upon getting on vehicle | NO | ON | NO | OFF | OFF |
| upon taking his seat | YES | OFF | NO | OFF | OFF |
| during unwinding of seatbelt out of winding shaft | YES | OFF | NO / YES | OFF / ON | OFF |
| during fastening of seatbelt | YES | OFF | YES | ON | OFF |
| upon unfastening of seatbelt | YES | OFF | YES | ON | OFF |
| upon getting off vehicle | NO | ON | YES | ON | ON |

Figure 4:
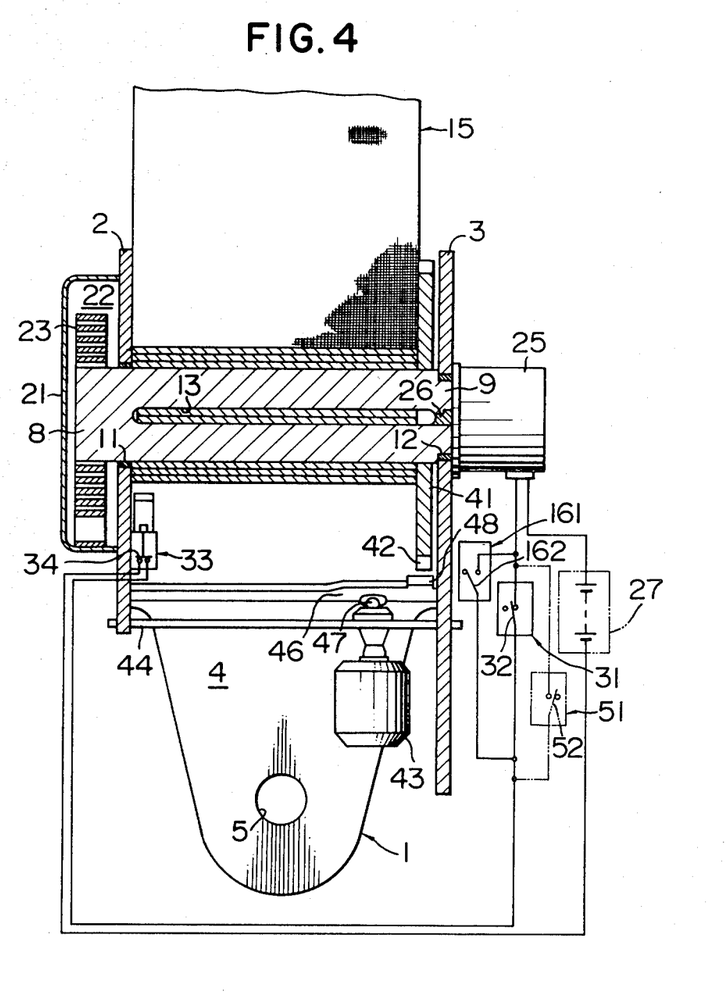
FIG. 4 is a view similar to FIG. 1, but showing a second embodiment of the present invention.

FIG. 4 illustrates the second embodiment of the present invention. In the second embodiment shown in FIG. 4, the same reference characters are applied to parts and members common in function to those of the first embodiment shown in FIGS. 1 and 2, and the description of such common parts and members will be omitted for simplification.

As will be clearly seen from FIG. 4, the retractor in accordance with the second embodiment is different from the first embodiment in that the retractor further comprises a brake sensor 161 for sensing whether the brake is applied to the vehicle to generate an ON-signal when the brake is applied to the vehicle and on OFF-signal when no brake is applied to the vehicle. The brake sensor 161 comprises a normally open switch 162 which is connected in parallel to the switch 32 of the seat sensor 31 and is closed when the brake is applied to the vehicle. Thus, in the second embodiment illustrated in FIG. 4, when the brake is applied to the vehicle, even if the seat sensor 31 is located in such position as to generate the OFF-signal, the motor 25 is energized in response to the ON-signals from the belt-diameter sensor 33 and the brake sensor 161 to rotate the winding shaft 7 to apply the winding force thereto. This enables the slack of the seatbelt 15 upon the application of the brake to the vehicle to be removed and enables the protection performance of the passenger by the seatbelt to be further improved.

Figure 5:
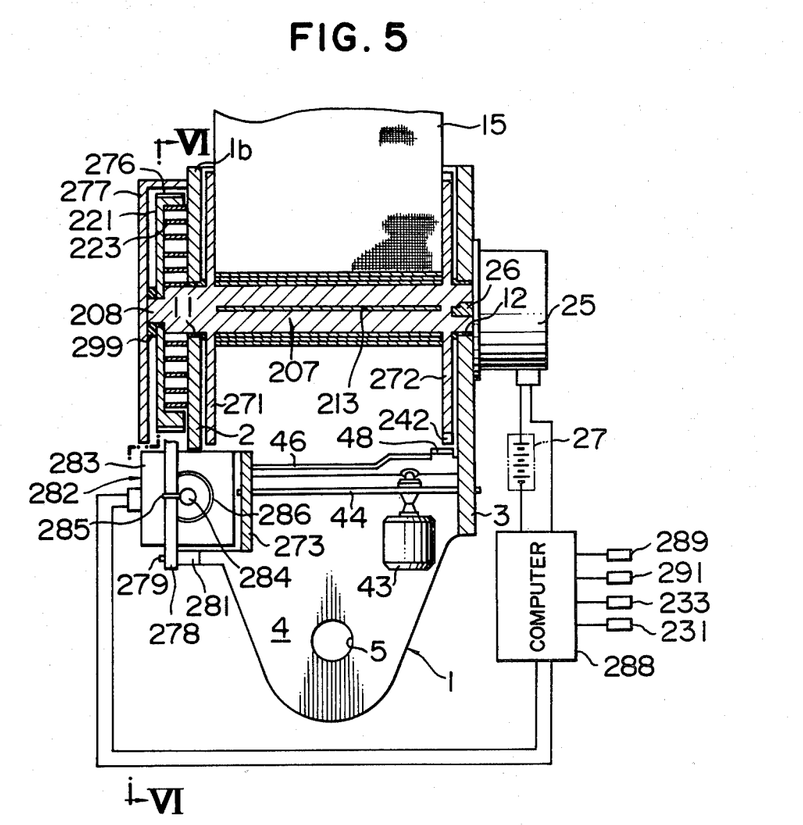
FIG. 5 is a view similar to FIG. 1, but showing a third embodiment of the present invention.
Figure 6:
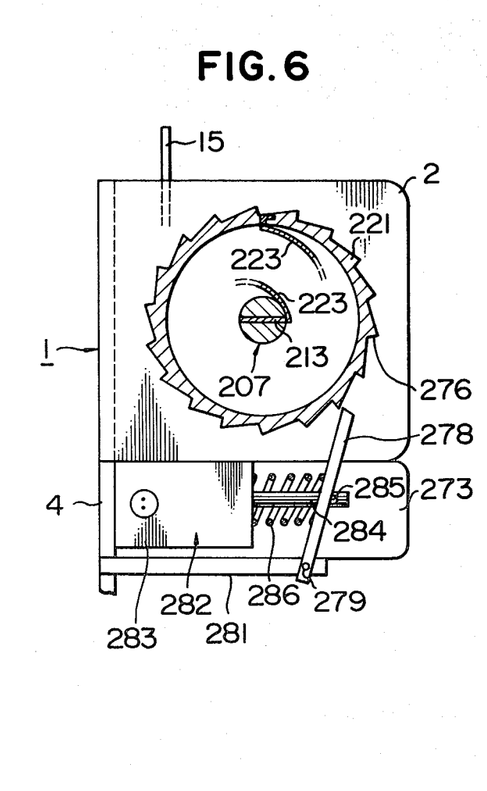
FIG. 6 is a cross-sectional view taken along the line VI—VI of FIG. 5 showing a pawl member disengaged from a toothed member.
Figure 7:
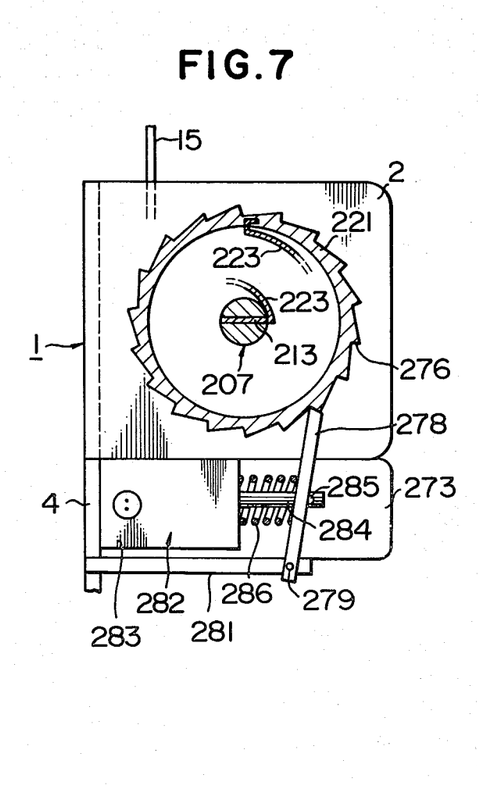
FIG. 7 is a view similar to FIG. 6 showing the pawl member engaged with the toothed member.

FIGS. 5-7 illustrate the retractor in accordance with the third embodiment of the present invention. In the embodiment shown in FIGS. 5-7, the same reference characters are applied to parts and members common in function to those of the first embodiment shown in FIGS. 1 and 2, and the description of such common parts and members will be omitted for simplification.

A winding shaft 207 of the retractor shown in FIGS. 5–7 has formed therethrough a longitudinal slot 213 into which one end of the seatbelt 15 is inserted and secured. The winding shaft 207 has formed integrally therewith a pair of axially spaced disc-like flanges 271 and 272 extending radially outwardly from the winding shaft. The seatbelt 15 is normally wound around the winding shaft 207 between the flanges 271 and 272. One of the flanges 272 has formed on its outer peripheral surface unidirectional teeth 242. The bracket 44 extends between and is secured to the side wall 3 and a bent and upstanding side wall section 273 on the frame 1. The pendulum 43 is pivotably supported by the bracket 244. The pawl member 46 extends between and is pivotably supported by the side wall 3 and the upstanding side wall section 273.

A cup-shaped member 221 is rotatably mounted on the end portion 208 of the winding shaft with a bottom wall of the cup-shaped member 221 abutting against a shoulder on the winding shaft 207. A spirally wound spring 223 having a low spring constant has one end thereof secured to the winding shaft 207 and the other end secured to the inner surface of the cup-shaped member 221. The cup-shaped member 221 is formed on its outer peripheral surface with unidirectional teeth 276. A cup-shaped cover member 277 is mounted on the side wall 2 of the frame 1 so as to cover the toothed cup-shaped member 223 and has a peripheral opening to expose a portion of the toothed cup-shaped member 223. A ring 299 made of the same material as the bushes 11 and 12 is disposed around a reduced-diameter portion 208 of the shaft 207 between the bottom walls of the cup-shaped members 221 and 277. An elongated pawl member 278 has one end thereof pivotally mounted by a pin 279 on an elongated member 281 secured to the rear wall 4 of the frame 1. The pawl member 278 is pivotable between a normal disengaging position shown in FIG. 6 where the other end of the pawl member 278 is disengaged from one of the teeth 276 on the toothed cup-shaped member 223 to allow the same to be rotated together with the winding shaft 207 and an engaging position shown in FIG. 7 where the other end of the pawl member 278 engages with one of the teeth 276 of the toothed cup-shaped member 223 to block the same against rotation relative to the frame 1. An actuator 282 for moving the pawl member 278 between the engaging and disengaging positions comprises an electromagnetic solenoid 283 and a plunger 284 movable between a normal extended position shown in FIG. 6 when the solenoid 283 is deenergized and a retracted position shown in FIG. 7 when the solenoid 283 is energized. The plunger 284 has secured thereto a pin 285 laterally projecting from the plunger, and the pawl member 278 is in contact with the pin 285. A compression coil spring 286 is disposed between an outer casing of the solenoid 283 and the pawl member 278 to urge the same against the pin 285 and to urge the plunger 284 to its extended position. Thus, the energization of the solenoid 283 causes the plunger 284 to be moved into its retracted position against the biasing force of the spring 286.

The electric power source 27 comprising a battery is connected between the electric motor 25 and a computer 288. The computer 288 controls the supply of electric current from the electric power source 27 to the motor 25 and the solenoid 283 of the actuator 282. Supplied into the computer 288 are signals from a buckle sensor 289, a belt-tension sensor 291, a belt-diamter sensor 233 and a seatback sensor 231. The buckle sensor 289 senses whether the buckle connected to the seatbelt 15 is locked to generate an ON-signal when the buckle is locked and an OFF-signal when the buckle is unlocked. The belt-tension sensor 291 senses the tension force acting on the seatbelt 15 to generate an ON-signal when the tension force on the seatbelt reaches a predetermined level and an OFF-signal when the tension force on the seatbelt is below the predetermined level. The belt-diameter sensor 233 is identical in structure and function with the belt-diameter sensor 33 used in the first embodiment shown in FIGS. 1 and 2. The seatback sensor 231 is mounted on a seatback of each seat of the vehicle for sensing whether the passenger takes his seat in a regular position to generate an ON-signal when the passenger takes his seat in a regular position and an OFF-signal when the passenger takes his seat in an irregular position.

Figure 8:
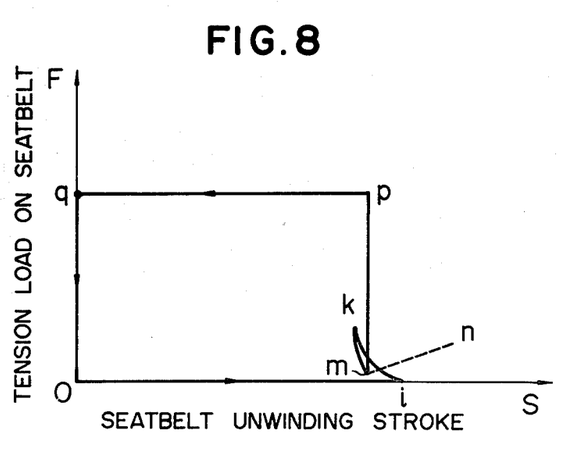
FIG. 8 is a graph showing characteristics of the retractor shown in FIGS. 5-7.

The operation of the retractor illustrated in FIGS. 5–7 will be described with reference to FIG. 8 and the below table III which indicates the relation between the actions taken by the passenger and the operation of the computer 288.

TABLE III

| actions of passenger | whether diameter of seatbelt around winding shaft is at most equal to predetermined diameter | belt-diameter sensor signal | whether buckle is locked | buckle sensor signal | whether tension load on seatbelt reaches predetermined level | belt-tension sensor signal | whether passenger takes his seat in regular position | seat-back sensor signal | signal to motor | signal to solenoid |
|---|---|---|---|---|---|---|---|---|---|---|
| prior to getting on vehicle | NO | OFF | NO | OFF | NO | OFF | NO | OFF | OFF | OFF |
| upon getting on vehicle | NO | OFF | NO | OFF | NO | OFF | NO | OFF | OFF | OFF |
| upon taking his seat | NO | OFF | NO | OFF | NO | OFF | NO YES | OFF ON | OFF | OFF |
| during unwinding of seatbelt out of winding shaft | NO YES | OFF ON | NO | OFF | NO | OFF | NO YES | OFF ON | OFF | OFF |
| immediately after fasten- | YES | ON | YES | ON | NO | OFF | NO | OFF | ON | OFF |

TABLE III-continued

| actions of passenger | whether diameter of seatbelt around winding shaft is at most equal to predetermined diameter | belt-diameter sensor signal | whether buckle is locked | buckle sensor signal | whether tension load on seatbelt reaches predetermined level | belt-tension sensor signal | whether passenger takes his seat in regular position | seatback sensor signal | signal to motor | signal to solenoid |
|---|---|---|---|---|---|---|---|---|---|---|
| ing of seatbelt | | | | | | | YES | ON | | |
| during normal fastening of seatbelt | YES | ON | YES | ON | YES | ON | NO | OFF | ON | OFF |
| | | | | | | | YES | ON | OFF | ON |
| upon unfastening of seatbelt | YES | ON | NO | OFF | NO | OFF | NO | OFF | ON | OFF |
| | | | | | | | YES | ON | ON | OFF |
| upon getting off vehicle | NO | OFF | NO | OFF | NO | OFF | NO | OFF | OFF | OFF |

The table III indicates under what conditions the motor 25 and the solenoid 283 of the actuator 282 are energized and deenergized. When the seatbelt 15 is unwound out of the winding shaft 207 in order for the passenger to fasten the seatbelt, the solenoid 283 is deenergized to allow the pawl member 278 to be moved into its disengaging position shown in FIG. 6 under the force of the spring 286, so that the toothed cup-shaped member 221 having secured thereto the outer end of the spirally wound spring 223 is allowed to be rotated together with the winding shaft 207. In addition, when the seatbelt 15 is unwound out of the winding shaft, 207, the motor 25 is also deenergized so that the output shaft 26 of the motor directly connected to the winding shaft is free to turn. Thus, when the seatbelt 15 is unwound out of the winding shaft 207, substantially no tension load is applied to the seatbelt to facilitate the unwinding operation of the seatbelt by the passenger. This corresponds to the section from 0 (zero) to i in FIG. 8. Then, when a tongue plate (not shown) connected to the seatbelt is inserted into the buckle and the buckle is locked the buckle sensor 289 supplies the ON-signal to the computer 288 to cause the motor 25 to be energized. The energization of the motor 25 drives the winding shaft 207 to rotate the same to cause the seatbelt 15 to be wound therearound, thereby to remove the slack of the seatbelt and to apply thereto such an extremely low tension load that the seatbelt is snugly fastened on the passenger. This corresponds to the section from i to k in FIG. 8. When the tension sensor 291 senses that the tension load on the seatbelt 15 by the energization of the motor 25 reaches the predetermined level (point m in FIG. 8) and the seatback sensor 231 senses that the passenger takes his seat in a regular position, the computer 288 causes the motor 25 to be deenergized. This corresponds to the section from k to m in FIG. 8. At the same point m, the computer 288 causes the solenoid 283 to be energized to angularly move the pawl member 278 in its engaging position shown in FIG. 7 so that the pawl member 278 is engaged with one of the teeth 276 on the toothed cup-shaped member 221 to lock the same against rotation relative to the frame 1. At this point m, only the extremely low tension force is applied to the seatbelt 15 and no slack of the seatbelt occurs, as far as the passenger takes his seat in a regular position, and substantially no oppression feeling is applied to the passenger. After the locking of the toothed cup-shaped member 221 against rotation relative to the frame 1 by the energization of the solenoid 283, no slack of the seatbelt occurs, even if the passenger moves between the regular and irregular positions on his seat, because the weak or low biasing force of the spirally wound spring 223 is applied to the winding shaft 207 to continuously remove the slack of the seatbelt. This corresponds to the section between m and n in FIG. 8. Thus, the protection performance which is the original or primary function of the seatbelt is not decreased. Upon the unfastening of the seatbelt, the buckle sensor 289 supplies the OFF-signal into the computer 288 to cause the solenoid 283 to be deenergized and simultaneously to cause the motor 25 to be energized, thereby to cause the winding shaft 207 to be rotated so that the seatbelt 15 is rapidly wound around the winding shaft. This corresponds to the sections from m to p, and p to q in FIG. 8. The motor 25 is deenergized in response to the OFF-signal from the belt-diameter sensor 233, or may be deenergized in response to the OFF-signal from the tension sensor 291. This corresponds to the section from q to 0 (zero) in FIG. 8. In summary, in FIG. 8, the section from 0 (zero) to i indicates the unwinding of the seatbelt 15 out of the winding shaft 207 in order for the passenger to fasten the seatbelt; the section i to k, the energization of the motor 25 for removing the slack of the seatbelt; the section from k to m, the connection of the other end of the spirally wound spring 223 to the frame 1; the section between m and n, the normal fastening of the seatbelt on the passenger; the sections from m to p and p to q, the energization of the motor 25 for winding of the seatbelt around the winding shaft 207 after the unfastening of the seatbelt; and the section from q to 0 (zero), the deenergization of the motor 25.

As described above, according to the third embodiment of the present invention, there are provided the advantages that since substantially no winding force is applied to the winding shaft 207 and to the seatbelt 15 upon the unwinding thereof out of the winding shaft in order for the passenger to fasten the seatbelt, the passenger can easily unwind the seatbelt for fastening the same; the slack of the seatbelt 15 immediately after the fastening thereof can be removed by the operation of the motor 25; the slack of the seatbelt during the normal fastening of the seatbelt can be continuously removed under the low or weak biasing force of the spring 223; and the seatbelt can be rapidly wound around the winding shaft 207 by the high and strong winding force due to the motor 25 upon the unlocking of the buckle of the seatbelt. These enable the fastening operation of the seatbelt to be facilitated without any decrease in protection performance to the passenger by the seatbelt, and also enable the oppression feeling on the passenger during the fastening of the seatbelt to be relieved.

In the first to third embodiments described above, the output shaft 26 of the motor 25 has been described and illustrated as being directly connected to the winding shaft 7, 207. However, the output shaft of the motor may be connected to the winding shaft through any coupling, reduction gear or the like. In addition, the present invention can be applied to a retractor of the type in which a seatbelt is doubly wound around a winding shaft.

What is claimed is:

1. A retractor for a safety seatbelt to be fastened on a passenger, for use in a vehicle having at least one seat for the passenger, said retractor comprising:
    a frame adapted to be fixed to the vehicle;
    a winding shaft rotatably mounted on said frame, the seatbelt being normally wound around said winding shaft;
    spring means for applying a weak biasing force to said winding shaft in such direction as to cause the seatbelt to be wound therearound;
    motor means drivingly connected to said winding shaft, said motor means, when operated, driving said winding shaft to rotate the same so as to cause the seatbelt to be forcibly wound around said winding shaft; and
    control means operative in response to one of two conditions, one being such that the seatbelt is unwound from said winding shaft and the passenger gets off the vehicle, and the other condition being such that the seatbelt is unwound from said winding shaft and the seatbelt is unfastened, for controlling said motor means so as to cause the same to be operated.

2. A retractor as defined in claim 1, wherein said spring means continuously applies the force and comprises a preloaded spring having one end thereof connected to said winding shaft and the other end connected to said frame.

3. A retractor as defined in claim 2, wherein said spring is a spirally wound spring.

4. A retractor as defined in claim 3, wherein said control means includes a first sensor for sensing whether the passenger takes his seat to generate an ON-signal when the passenger leaves his seat and an OFF-signal when the passenger takes his seat, and a second sensor for sensing a diameter of the seatbelt wound around said winding shaft to generate an ON-signal when the diameter of seatbelt wound around said winding shaft is at most equal to a predetermined diameter and an OFF-signal when the diameter of the seatbelt wound around said winding shaft is above said predetermined diameter, said drive means being operated in response to the ON-signals from said first and second sensors.

5. A retractor as defined in claim 4, wherein said control means further includes a third sensor for sensing whether the brake is applied to the vehicle to generate an ON-signal when the brake is applied to the vehicle and an OFF-signal when no brake is applied to the vehicle, said drive means being operated in response to the ON-signals from said second and third sensors.

6. A retractor as defined in claim 5, wherein said first sensor comprises a switch associated with the seat and closed when the passenger leaves the seat.

7. A retractor as defined in claim 3, wherein said control means includes a first sensor for sensing whether a door of the vehicle associated with the passenger is closed to generate an ON-signal when the door is opened and an OFF-signal when the door is closed, and a second sensor for sensing a diameter of the seatbelt wound around said winding shaft to generate an ON-signal when the diameter of the seatbelt wound around said winding shaft is at most equal to a predetermined diameter and an OFF-signal when the diameter of the seatbelt wound around said winding shaft is above said predetermined diameter, said drive means being operated in response to the ON-signals from said first and second sensors.

8. A retractor as defined in claim 7, wherein said control means further includes a third sensor for sensing whether the brake is applied to the vehicle to generate an ON-signal when the brake is applied to the vehicle and an OFF-signal when no brake is applied to the vehicle said drive means being operated in response to the ON-signals from said second and third sensors.

9. A retractor as defined in claim 8, wherein said first sensor comprises a switch associated with the door of the vehicle and closed when the door is opened.

10. A retractor as defined in claim 6 or 9, wherein said drive means comprises an electric motor having its output shaft drivingly connected to said winding shaft.

11. A retractor as defined in claim 10, wherein the operation of said drive means is suspended in response to the OFF-signal from said second sensor.

12. A retractor as defined in claim 11, further comprising a toothed member fixedly mounted on said winding shaft for rotation therewith, and locking means operative in response to a predetermined deceleration of the vehicle to engage with said toothed member for locking said winding shaft against rotation relative to said frame.

13. A retractor as defined in claim 1, wherein said spring means applies no biasing force to the seatbelt during the unwinding thereof from said winding shaft in order for the passenger to fasten the seatbelt, but applying a weak biasing force to said winding shaft in such direction as to cause the seatbelt to be wound therearound after the snug fastening of the seatbelt on the passenger, said spring means comprising a spring having one end thereof connected to said winding shaft and the other end connectable to said frame.

14. A retractor as defined in claim 13, wherein said spring is a spirally wound spring.

15. A retractor as defined in claim 14, further comprising a toothed member fixedly mounted on said winding shaft for rotation therewith, said other end of said spring being fixedly connected to said toothed member, and locking means mounted on said frame and movable between an engaging position where said locking means engages with said toothed member to fixedly connect said the other end of said spring to said frame through said toothed member and a disengaging position where said locking means is disengaged from said toothed member to allow the same to be rotated together with said winding shaft, said control means controlling said locking means so as to move the same into said engaging position when the seatbelt is snugly fastened on the passenger and the operation of said drive means is suspended.

16. A retractor as defined in claim 15, wherein said control means includes a first sensor for sensing whether the seatbelt is fastented to generate an ON-signal when the seatbelt is fastened and an OFF-signal when the seatbelt is unfastened, and a second sensor for sensing a diameter of the seatbelt wound around said winding shaft to generate an ON-signal when the diameter of the seatbelt wound around said winding shaft is at most equal to a predetermined diameter and an OFF-signal when the diameter of the seatbelt wound around said winding shaft is above said predetermined diameter, said drive means being operated in response to the ON-signals from said first and second sensors.

17. A retractor as defined in claim 16, wherein said control means further includes a third sensor for sensing the tension force acting on the seatbelt to generate an ON-signal when the tension force on the seatbelt reaches a predetermined level by the operation of said drive means and an OFF-signal when the tension force on the seatbelt is below said predetermined level, and a fourth sensor for sensing whether the passenger takes his sent in a regular position to generate an ON-signal when the passenger takes his seat in a regular position and an OFF-signal when the passenger takes his seat in an irregular position, the operation of said drive means being suspended in response to the ON-signals from said third and fourth sensors.

18. A retractor as defined in claim 17, wherein the operation of said drive means is suspended and said locking means is moved into said engaging position in response to the ON-signals from said first to fourth sensors.

19. A retractor as defined in claim 18, wherein said locking means comprises a pawl member movably mounted on said frame and an actuator for actuating said pawl member so as to cause the same to be moved between an engaging position where said pawl member engages with said toothed member and a disengaging position where said pawl member is disengaged from said toothed member, said actuator being operative in response to the ON-signals from said first to fourth sensors to move said pawl member into said engaging position.

20. A retractor as defined in claim 19, wherein said first sensor senses whether a buckle connected to the seatbelt is locked to generate the ON-signal when the buckle is locked and an OFF-signal when the buckle is unlocked.

21. A retractor as defined in claim 20, wherein said actuator comprises an electromagnetic solenoid.

22. A retractor as defined in claim 21, wherein said drive means comprises an electric motor having its output shaft drivingly connected to said winding shaft.

23. A retractor as defined in claim 22, further comprising a second toothed member fixedly mounted on said winding shaft for rotation therewith, and second locking means operative in response to a predetermined deceleration of the vehicle to engage with said second toothed member for locking said winding shaft against rotation relative to said frame.

* * * * *